(Model.)

G. W. BENNUM.
Separable Button.

No. 243,054. Patented June 21, 1881.

Witnesses:
M. W. Lacey
A. Parker

Inventor:
George W. Bennum
By R. S. & A. P. Lacey
Att'ys

UNITED STATES PATENT OFFICE.

GEORGE W. BENNUM, OF GEORGETOWN, DELAWARE, ASSIGNOR OF ONE-HALF TO JOHN H. PAYNTER, OF SAME PLACE.

SEPARABLE BUTTON.

SPECIFICATION forming part of Letters Patent No. 243,054, dated June 21, 1881.

Application filed April 30, 1881. (Model.)

*To all whom it may concern:*

Be it known that I, GEORGE W. BENNUM, a citizen of the United States, residing at Georgetown, in the county of Sussex and State of Delaware, have invented certain new and useful Improvements in Separable Buttons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of buttons in which the outer disk or button is connected to an inner disk by means of a telescope-shank, so that the two parts may be readily separated.

It consists in a series of beveled shoulders formed on the inner side of the hollow shank of the inner disk, and a corresponding series of locking-shoulders formed on the side of the stem of the outer disk, and a catch pivoted in a slot in said stem and held by a spring and operated by a push-rod, as hereinafter fully explained.

Figure 1:
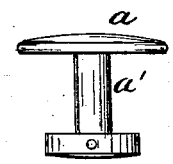
Figure 2:
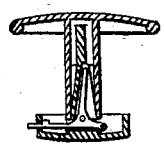
Figure 3:
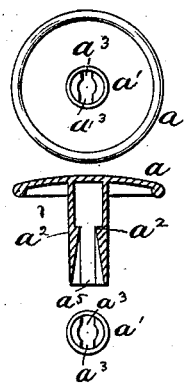
Figure 4:
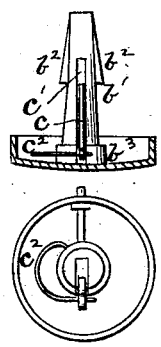
Figure 5:
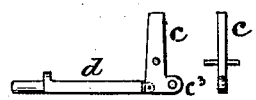

In the drawings, Figure 1 is a side elevation, and Fig. 2 is a vertical section, of a button having my improvements attached thereto. Fig. 3 is a detail view of the inner disk with its tubular shank. Fig. 4 is the outer disk or button, showing the catch, the spring, and pusher; and Fig. 5 shows the catch and pusher in detail. The several figures in the drawings are made on a scale much larger than an ordinary button, so that the parts may be more clearly illustrated.

$a$ is the inner disk, provided with a tubular shank or stem, $a'$.

$a^2$ $a^2$ are two shoulders formed on the inner side of the tubular shank, and arranged diametrically opposite each other, and are tapered outward to the rim of the shank, so as to present inclined or beveled faces, as shown. These shoulders are arranged so as to have intervening spaces, $a^3$ $a^3$, between them, to permit the free passage of the shoulders on the stem of the outer disk or button, $b$. I employ only two shoulders, $a^2$, though more than that number could be employed, or only one, if desired; but I prefer two, as shown, as the best results are obtained thereby.

$b$ is the outer disk or button proper. It has a solid stem or shank, $b'$, which slides into the tubular stem $a'$. It has formed on its opposite sides the locking-shoulders $b^2$ $b^2$, tapered toward the point of the stem, and arranged so that when the stem $b'$ is inserted into the tubular stem $a'$ the said shoulders may be turned around and lock against the shoulders $a^2$. The stem $b'$ has its inner end, $b^3$, next the disk, made of same diameter as the tubular stem $a'$, so that the latter abuts snugly against the said enlargement.

$c$ is the catch, which is placed in the longitudinal slot $c'$ formed in the shank $b'$. It has its outer end pivoted in the slot in the enlargement $b^3$, and is provided with a short horizontal lug, $c^3$, which projects slightly outside of the periphery of the shank. It is held by a spring, $c^2$, which bears on the lug $c^3$ and presses the outer end into the slot and causes the inner end to project slightly beyond the periphery of the shank. When the shank is pushed into the hollow stem $a'$ the beveled face of one of the shoulders $a^2$ pushes the inner end of the catch into the slot, and holds it there till the shank is turned so as to bring the catch opposite one of the longitudinal channels between the shoulders $a^2$, when the said catch is thrown outward by the spring and locks the button.

$d$ is a push-rod, one end of which projects through the rim of the button, while the other end is put through a hole in the shank and strikes the end of catch next the disk. The shank $b'$ is put into the tubular stem $a'$, and is then given a turn which brings the shoulders $a^2$ $b^2$ opposed to each other, and the catch $c$ drops into one of the openings or spaces between the shoulders and locks the two parts firmly together. To separate the parts, the pusher is pressed upon, which draws the catch into the slot in the stem $b'$, so that the latter can be turned and the shoulders disengaged, and then the stem $b'$ can be withdrawn from the tubular stem.

Having described my invention, what I claim, and desire to secure by Letters Patent, is—

The combination, with the tubular stem $a'$, provided with inner shoulders, $a^2$, beveled from their inner ends outward to the end of the stem, and formed so as to provide intermediate longitudinal channels, $a^3$, of the shank $b'$, having an enlargement, $b^3$, at its outer end, and provided with lateral shoulders $b^2$, adapted to slide into the channels $a^3$ and be turned to engage the shoulders $a^2$, and having a longitudinal slot, $c'$, the catch $c$, pivoted near its outer end in the slot $c'$, and pressed inward by the spring $c^2$ so as to throw the inner end out of the slot, and the pusher $d$, substantially as set forth.

In testimony whereof I affix my signature in presence of two witnesses.

GEORGE WASHINGTON BENNUM.

Witnesses:
  EDWARD D. HEARN,
  JOHN L. THOMPSON.